United States Patent
Katakura et al.

(10) Patent No.: US 8,472,596 B2
(45) Date of Patent: Jun. 25, 2013

(54) COMMUNICATION SYSTEM, PROCESSING APPARATUS, AND COMMUNICATION METHOD IN COMMUNICATION SYSTEM

(75) Inventors: Yukio Katakura, Kawasaki (JP); Hiroaki Komine, Kawasaki (JP); Yasuo Maeda, Kawasaki (JP); Katsuyoshi Tsuhara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 294 days.

(21) Appl. No.: 13/075,821

(22) Filed: Mar. 30, 2011

(65) Prior Publication Data

US 2011/0293080 A1    Dec. 1, 2011

(30) Foreign Application Priority Data

May 27, 2010  (JP) .................................. 2010-121370

(51) Int. Cl.
*H04M 15/00* (2006.01)

(52) U.S. Cl.
USPC .................. 379/112.04; 379/112.01; 379/133; 370/401

(58) Field of Classification Search
USPC .................. 379/111, 112.01, 112.04, 112.06, 379/112.08, 112.09, 112.1, 133, 134, 210.02; 370/230, 236, 236.2, 237, 400, 401, 409
See application file for complete search history.

(56) References Cited

U.S. PATENT DOCUMENTS

| | | | |
|---|---|---|---|
| 2006/0190603 A1 | 8/2006 | Anzai et al. | |
| 2006/0280165 A1* | 12/2006 | Blumenschein et al. | 370/352 |
| 2008/0120688 A1* | 5/2008 | Qiu et al. | 726/1 |
| 2010/0274893 A1* | 10/2010 | Abdelal et al. | 709/224 |
| 2011/0040845 A1* | 2/2011 | Cai et al. | 709/206 |
| 2012/0099714 A1* | 4/2012 | Hodge | 379/88.16 |

FOREIGN PATENT DOCUMENTS

| | | |
|---|---|---|
| JP | 60-219851 | 11/1985 |
| JP | 2006-222631 | 8/2006 |
| JP | 2007-312277 | 11/2007 |

* cited by examiner

*Primary Examiner* — Binh Tieu
(74) *Attorney, Agent, or Firm* — Staas & Halsey LLP

(57) ABSTRACT

A processing apparatus, including: a query statistics unit which inputs a query request for querying a destination for first telephone number, and counts the number of input query requests; and a restriction control unit which transmits to a restriction control apparatus which performs outgoing call restriction, a restriction request to restrict a telephone call by second telephone number, when the counted number of the query requests is equal to or greater than a restriction start threshold, wherein the telephone call by the second telephone number is restricted by transmission of the restriction request, and a telephone call by the first telephone number is performed.

11 Claims, 15 Drawing Sheets

FIG. 4

| PRIORITIZED TELEPHONE NUMBER | RESTRICTION START THRESHOLD | RESTRICTION CANCELLATION THRESHOLD | NUMBER OF QUERIES IN THE CURRENT CYCLE | UNDER-RESTRICTION FLAG |
|---|---|---|---|---|
| Na_1 | Xa_1 | Xb_1 | Y_1 | Ca_1 |
| Na_2 | Xa_2 | Xb_2 | Y_2 | Ca_2 |
| Na_3 | Xa_3 | Xb_3 | Y_3 | Ca_3 |
| Na_4 | Xa_4 | Xb_4 | Y_4 | Ca_4 |
| Na_5 | Xa_5 | Xb_5 | Y_5 | Ca_5 |
| ... | ... | ... | ... | ... |
| Na_n | Xa_n | Xb_n | Y_n | Ca_n |

| PRIORITIZED TELEPHONE NUMBER | NON-PRIORITIZED TELEPHONE NUMBER | UNDER-RESTRICTION FLAG 332 |
|---|---|---|
| Na_1 | Nb_1 | Cb_1 |
| Na_2 | Nb_2 | Cb_2 |
| Na_3 | Nb_3 | Cb_3 |
| Na_4 | Nb_4 | Cb_4 |
| Na_5 | Nb_5 | Cb_5 |
| ... | ... | ... |
| Na_m | Nb_m | Cb_m |

FIG. 5B

| PRIORITIZED TELEPHONE NUMBER | NON-PRIORITIZED TELEPHONE NUMBER | UNDER-RESTRICTION FLAG 332 |
|---|---|---|
| Na_1 | Nb_1 | ON |
| Na_1 | Nb_2 | ON |
| Na_1 | Nb_3 | ON |
| ... | ... | ... |
| Na_m | Nb_m | Cb_m |

FIG. 6A

| NON-PRIORITIZED TELEPHONE NUMBER | UNDER-RESTRICTION FLAG |
|---|---|
| Nb_1 | Cc_1 |
| Nb_2 | Cc_2 |
| Nb_3 | Cc_3 |
| Nb_4 | Cc_4 |
| Nb_5 | Cc_5 |
| ... | ... |
| Nb_o | Cc_o |

| NON-PRIORITIZED TELEPHONE NUMBER | UNDER-RESTRICTION FLAG |
|---|---|
| Nb_1 | ON |
| Nb_2 | ON |
| Nb_3 | ON |
| Nb_4 | OFF |
| ... | ... |
| Nb_o | Cc_o |

333

| PRIORITIZED TELEPHONE NUMBER | NON-PRIORITIZED TELEPHONE NUMBER | UNDER-RESTRICTION FLAG |
|---|---|---|
| .... | .... | .... |
| Na_5 | Nb_6 | OFF |
| Na_7 | Nb_6 | ON |
| .... | .... | .... |

332

| NON-PRIORITIZED TELEPHONE NUMBER | UNDER-RESTRICTION FLAG |
|---|---|
| .... | .... |
| Nb_6 | ON ← OFF |
| .... | .... |

333

COMMUNICATION SYSTEM, PROCESSING APPARATUS, AND COMMUNICATION METHOD IN COMMUNICATION SYSTEM

CROSS-REFERENCE TO RELATED APPLICATIONS

This application is based upon and claims the benefit of priority of the prior Japanese Patent Application No. 2010-121370, filed on May 27, 2010, the entire contents of which are incorporated herein by reference.

FIELD

The embodiments discussed herein are related to a processing apparatus, communication system, and communication method in the communication system.

BACKGROUND

In the prior art, IP networks and other communication systems have provided VoIP (Voice over Internet Protocol) and other telephone services, as well as web page browsing services through access by a web browser and similar.

However, when telephony and web page access are concentrated at one time, cases occur in which the communication system enters a congested state. In such cases, time required to response to communication requests and similar becomes longer, and as a result provision of continuous service becomes more difficult.

The following technologies, for example, address such congested states. That is, a VoIP gateway apparatus transmits a request to a SIP server, measures the time until a response is received, and when the time exceeds a threshold value or similar, judges the SIP server to be in a congested state, and restricts the transmission of new requests to the SIP server.

Further, there is also a technology in which a congestion control apparatus receives a request message for a web server transmitted from a client, and acquires an IP address corresponding to the host name contained in the message from a DNS server. And, based on a congestion management table, the congestion control apparatus judges whether the IP address is in a congested state, and upon judging that the state is a congested state, distributes request messages to web servers with the same host name as the host name, and with different IP addresses which are not in a congested state.

Patent Document 1: Japanese Laid-open Patent Publication No. 2007-312277
Patent Document 2: Japanese Laid-open Patent Publication No. 2006-222631

However, in both of the above-described technologies restriction or other congestion control processing is performed for an SIP server, IP address or similar after congestion has occurred and a judgment of a congested state has been made. Hence neither of the above-described technologies can suppress the occurrence of congestion in advance, prior to the occurrence of congestion.

Further, when among the above-described technologies a technology to restrict transmission of new requests is used, even if a telephone call for restriction has high priority compared with other telephone calls, upon judgment of a congested state, transmission of new requests for the telephone call is restricted. Hence when using such technology there are cases in which a telephone call with high priority compared with other telephone calls cannot be continuously provided.

Also, when among the above-described technologies a technology to distribute request messages to other IP addresses is used, even for example in the case of a web page with high priority compared with others, if an IP address of a web server providing this web page is judged to be in a congested state, distribution to other web servers is performed. Hence when using this technology, there are cases in which, due to distribution of request messages to other web servers, browsing of the web page cannot be continuously provided.

SUMMARY

According to an aspect of the invention, a processing apparatus including: a query statistics unit which inputs a query request for querying a destination for first telephone number, and counts the number of input query requests; and a restriction control unit which transmits to a restriction control apparatus which performs outgoing call restriction, a restriction request to restrict a telephone call by second telephone number, when the counted number of the query requests is equal to or greater than a restriction start threshold, wherein the telephone call by the second telephone number is restricted by transmission of the restriction request, and a telephone call by the first telephone number is performed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a first statistics table;
FIG. 5A and FIG. 5B illustrate examples of a second statistics table;
FIG. 6A and FIG. 6B illustrate examples of a third statistics table.

DESCRIPTION OF EMBODIMENTS

Below, embodiments for implementation of this invention are explained. First the overall configuration of a communication system 10 is explained, and each of the units within the communication system 10 is explained.

(Example of Overall Configuration)

Figure 1:
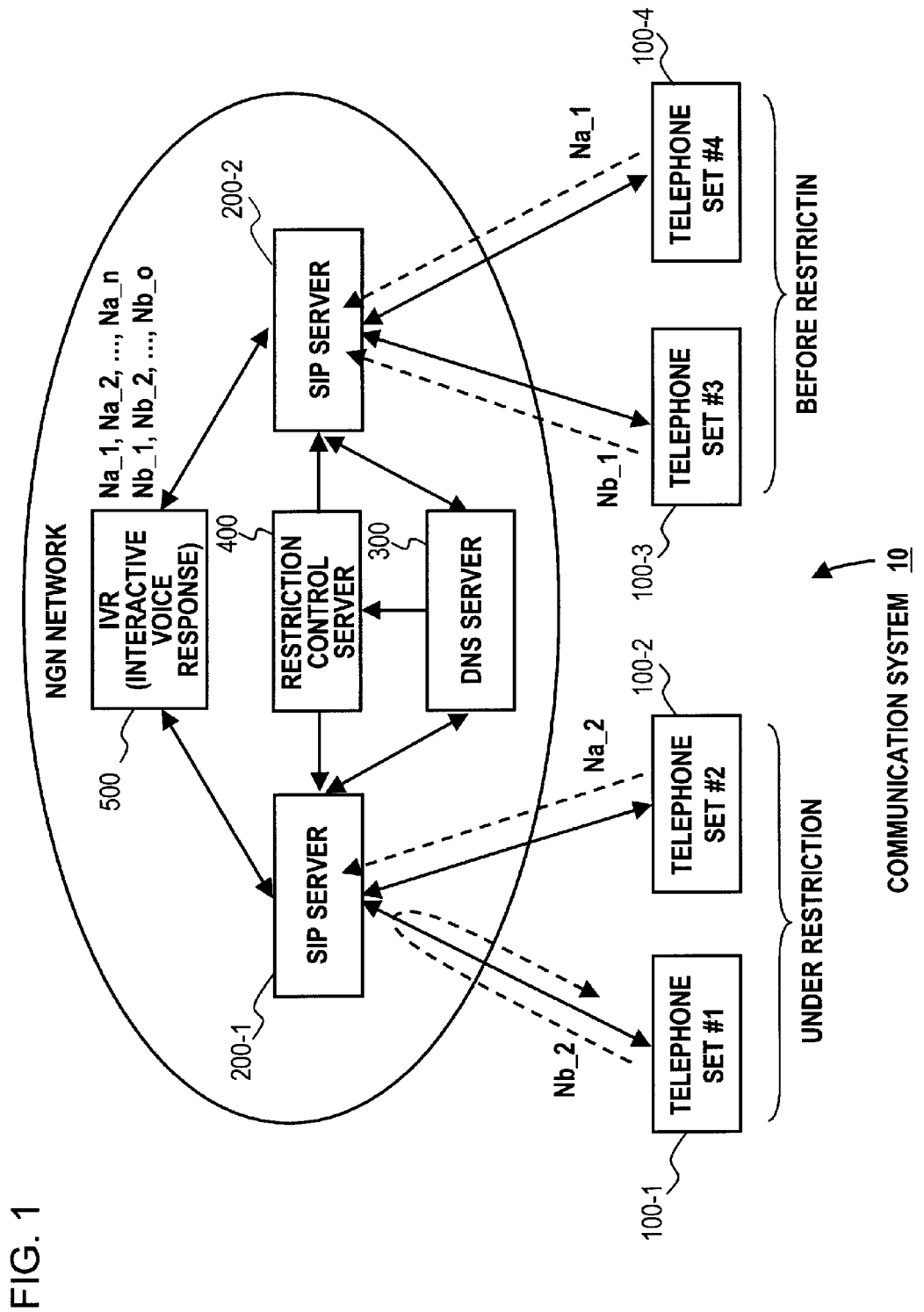
FIG. 1 illustrates an example of the configuration of a communication system.

FIG. 1 illustrates an example of the configuration of a communication system 10. In this communication system 10, for example telephone sets 100-1 to 100-4, by telephoning an automated voice response apparatus called an IVR (Interactive Voice Response) 500, can receive voice and other telephone services from the IVR 500. Types of telephone services include, for example, the disaster emergency message service, commercial broadcasts, and similar.

As illustrated in FIG. 1, the communication system 10 comprises telephone sets 100-1 to 100-4, SIP (Session Initiation Protocol) servers 200-1 and 200-2, a DNS (Domain Name System) server 300, a restriction control server 400, and an IVR (Interactive Voice Response) 500.

The telephone sets 100-1 to 100-4, by transmitting a telephone call request specifying a telephone number to the IVR 500, receive automated voice or other telephone services provided from the IVR 500. Such telephone requests and similar are for example called SIP messages; SIP messages which are telephone requests may be, for example, "INVITE" messages and similar. A SIP message includes for example the telephone number of the receiving-side IVR 500, and also includes the URI (Uniform Resource Identifier) of the IVR 500. The URI is in a format indicating the location of an information resource on a network; the URI of the IVR 500 is for example held in advance by the telephone sets 100-1 to 100-4. For example, when the telephone number of an IVR 500 is "01-2345-6789", the URI can be represented by "0123456789@***.ne.jp". In this way, telephone number information is included in a URI.

The SIP servers 200-1 and 200-2 transfer (or routes) SIP messages, for example, transmitted from the telephone sets 100-1 to 100-4 (or messages; hereafter, unless stated otherwise, these are called "SIP messages") to the transfer destination. Further, the SIP servers 200-1 and 200-2 transfer SIP messages and similar transmitted from the IVR 500 to the telephone sets 100-1 to 100-4. The SIP servers 200-1 and 200-2 are for example transfer apparatuses. At this time, the SIP servers 200-1 and 200-2 specify the destination of a received SIP message, and transmit the SIP message to the destination. Destinations are specified by for example, performing conversion from the URI of the IVR 500 to an IP address of the IVR 500.

For example, the SIP servers 200-1 and 200-2 receive SIP messages transmitted from telephone sets 100-1 to 100-4, convert URIs contained in the SIP messages into IP addresses, and transmit the SIP messages addressed to the IP addresses. At this time, when the SIP servers 200-1 and 200-2 are holding IP addresses corresponding to the URIs, these IP addresses are used, and when IP addresses are not being held, a query request seeking conversion from a URI to an IP address (or querying a destination) is transmitted to the DNS server 300. Further, the SIP servers 200-1 and 200-2 receive restriction requests from the restriction control server 400, and upon receiving from a telephone set 100-1 to 100-4 a SIP message including the same telephone number as the telephone number (non-prioritized telephone number) included in a restriction request, perform outgoing call restriction. Details are explained below.

The DNS server 300 is a processing apparatus which, for example, converts to an IP address a URI for which there has been a query. The DNS server 300 acquires, for example from a conversion table, an IP address corresponding to a URI for which there has been a query from an SIP server 200-1 or 200-2, and returns this to the SIP server 200-1 or 200-2.

Further, when a URI for which there has been a query corresponds to a prioritized telephone number (or a prioritized telephone number is included in the URI), the DNS server 300 counts the number of cases of the URI (or the prioritized telephone numbers for which there have been queries). And, when certain conditions are satisfied, the DNS server 300 transmits a restriction request to the restriction control server 400.

Here, prioritized telephone numbers and non-prioritized telephone numbers are explained. In this example, for example it is assumed that on the receiving side there are a plurality of telephone numbers for the IVR 500, and that division into prioritized telephone numbers and non-prioritized telephone numbers is possible. Prioritized telephone numbers are telephone numbers which provide telephone call services with high priority compared with other telephone call services, such as for example the disaster emergency message service and similar. On the other hand, non-prioritized telephone numbers are telephone numbers providing telephone call services with low priority compared with others, such as for example commercial broadcasts and similar. The example of FIG. 1 illustrates an example in which "Na_1, Na_2, . . . , Na_n" are prioritized telephone numbers, and "Nb_1, Nb_2, . . . , Nb_o" are non-prioritized telephone numbers.

The restriction control server 400 is a restriction control apparatus which for example requests outgoing call restriction or outgoing call restriction cancellation for non-prioritized telephone numbers. The restriction control server 400 receives restriction requests output from the DNS server 300 and transmits outgoing call restriction requests to the SIP servers 200-1 and 200-2 so as to restrict non-prioritized telephone numbers for restriction included in the restriction requests. Non-prioritized telephone numbers, which are deemed as restriction targets, are, for instance, subjected to outgoing call restriction. The restriction server 400 is a restriction control apparatus which issues requests to the SIP servers 200-1 and 200-2 to restrict non-prioritized telephone numbers based on requests from the DNS server 400.

In this example, objects for restriction are non-prioritized telephone numbers; during restriction, telephone calls are not made to non-prioritized telephone numbers, whereas telephone calls can be made to prioritized telephone numbers even during restriction. For example, as illustrated in FIG. 1, when the non-prioritized telephone number "Nb_2" is an object for restriction, telephone calls cannot be made to this non-prioritized telephone number "Nb_2", but telephone calls can be made to the prioritized telephone number "Na_2" corresponding to the non-prioritized telephone number "Nb_2". On the other hand, when the non-prioritized telephone number "Nb_1" is not restricted, telephone calls to this non-prioritized telephone number "Nb_1" are not restricted, and telephone calls can be made. Before implementing the restriction the prioritized telephone number "Na_1" is not an object for restriction, and telephone calls are allowed.

When the IVR 500 stores audio, characters or similar in for example a storage unit or similar, stored audio or similar can be transmitted automatically in response to a request from a telephone set 100-1 to 100-4. Further, as explained above the IVR 500 has a plurality of telephone numbers, which are divided into prioritized telephone numbers and non-prioritized telephone numbers.

(Example of Configurations of Units)

Figure 2:
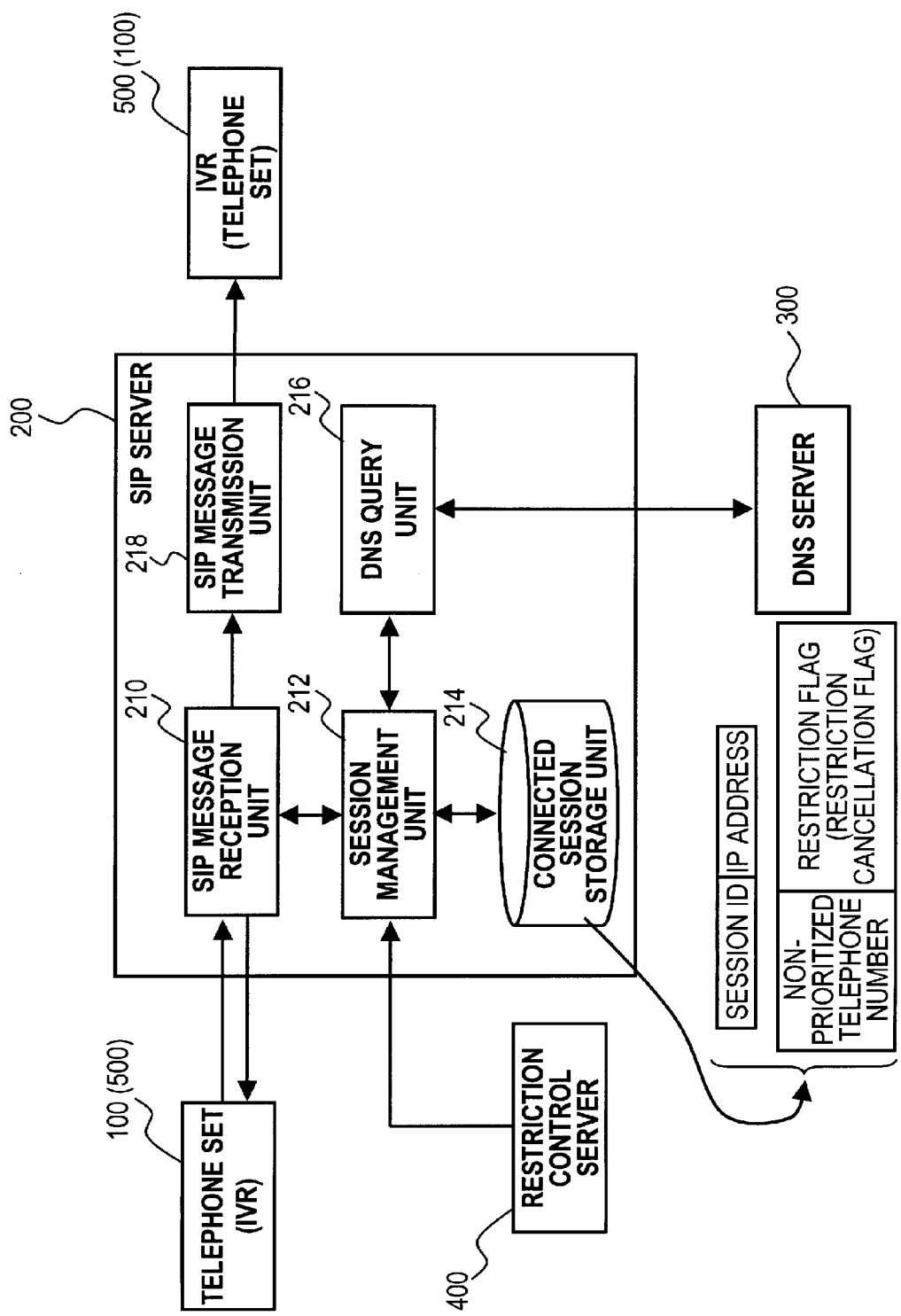
FIG. 2 illustrates an example of the configuration of an SIP server.

Next, an example of the configuration of the SIP servers 200-1 and 200-2, DNS server 300, and restriction control server 400 in the communication system 10 is explained. FIG. 2 illustrates an example of the configuration of the SIP servers 200. The SIP servers 200 comprise a SIP message reception unit 210, session management unit 212, connected session storage unit 214, DNS query unit 216, and SIP message transmission unit 218.

The SIP message reception unit 210 receives SIP messages transmitted from telephone sets 100-1 to 100-4, and for example outputs to the session management unit 212 the session IDs and URIs of destinations (or of the receiving side, for example the IVR 500) included in the received SIP messages. Upon receiving an IP address corresponding to a URI from the session management unit 212, the SIP message reception unit 210 issues a request to the SIP message transmission unit 218 to transmit a SIP message with the IP address (for example, the IP address of the IVR 500) as the destination. When the received SIP message is from the IVR 500 also, the SIP message reception unit 210 outputs to the session management unit 212 the session ID and IP address of the telephone set 100-1 to 100-4 which is the destination. The SIP message reception unit 210, upon input of confirmation of the session ID from the session management unit 212, issues a request to the SIP message transmission unit 218 to reply to the telephone set 100-1 to 100-4 with the received SIP message.

The session management unit 212 manages sessions of SIP messages received by the SIP message reception unit 210. For example, the session management unit 212 accesses the connected session storage unit 214 and confirms whether a session ID which is the same as a session ID included in a received SIP message is stored. When the same session ID is stored, the session management unit 212 reads out the stored IP address corresponding to the session ID, and outputs the IP address to the SIP message reception unit 210. On the other hand, when the same session ID is not stored, the session management unit 212 outputs to the DNS query unit 216 a query request to the DNS together with the URI received from the SIP message reception unit 210. And, the session management unit 212, upon acquiring the corresponding IP address from the DNS query unit 216, stores the IP address in the connected session storage unit 214 so as to correspond to the session ID, and outputs the IP address to the SIP message reception unit 210. The session ID is for example issued in advance from a home agent or other similar apparatus, and is transmitted to the telephone sets 100-1 to 100-4 and to the SIP server 200 and similar; the telephone sets 100-1 to 100-4 and similar use this to transmit SIP messages.

Further, upon receiving a restriction request including a non-prioritized telephone number for restriction from the restriction control server 400, the session management unit 212 stores the non-prioritized telephone number in the connected session storage unit 214. In this case, the session management unit 212 confirms whether, for example, a telephone number included in an SIP message received by the SIP message reception unit 210 is a non-prioritized telephone number for restriction. For example, the session management unit 212 accesses the connected session storage unit 214, and when the same telephone number is stored as a non-prioritized telephone number for restriction, outputs to the SIP message reception unit 210 the information that a telephone call cannot be made to the non-prioritized telephone number. By this means, for example a telephone call not possible message is returned from the SIP message reception unit 210 to the telephone set 100. On the other hand, when a non-prioritized telephone number for restriction is not included, the session management unit 212 performs session management of the above-described SIP message.

The connected session storage unit 214 stores session IDs as well as IP addresses transmitted from the DNS server 300. Further, the connected session storage unit 214 also stores non-prioritized telephone numbers for restriction transmitted from the restriction control server 400, and restriction flags indicating whether the non-prioritized telephone numbers are objects for restriction. Also, the connected session storage unit 214 stores restriction cancellation flags indicating whether restriction has been cancelled for the non-prioritized telephone numbers.

When there is an IP address query from the session management unit 212, the DNS query unit 216 transmits a query request for the corresponding IP address to the DNS server 300. For example, the DNS query unit 216 takes as input a query including a URI from the session management unit 212, and transmits a query request including this URI to the DNS server 300. Further, upon acquiring in response to this query request an IP address from the DNS server 300, the DNS query unit 216 outputs this IP address to the session management unit 212.

The SIP message transmission unit 218 transmits to the IVR 500 or a telephone set 100-1 to 100-4 an SIP message requested (or output) by the SIP message reception unit 210.

Figure 3:
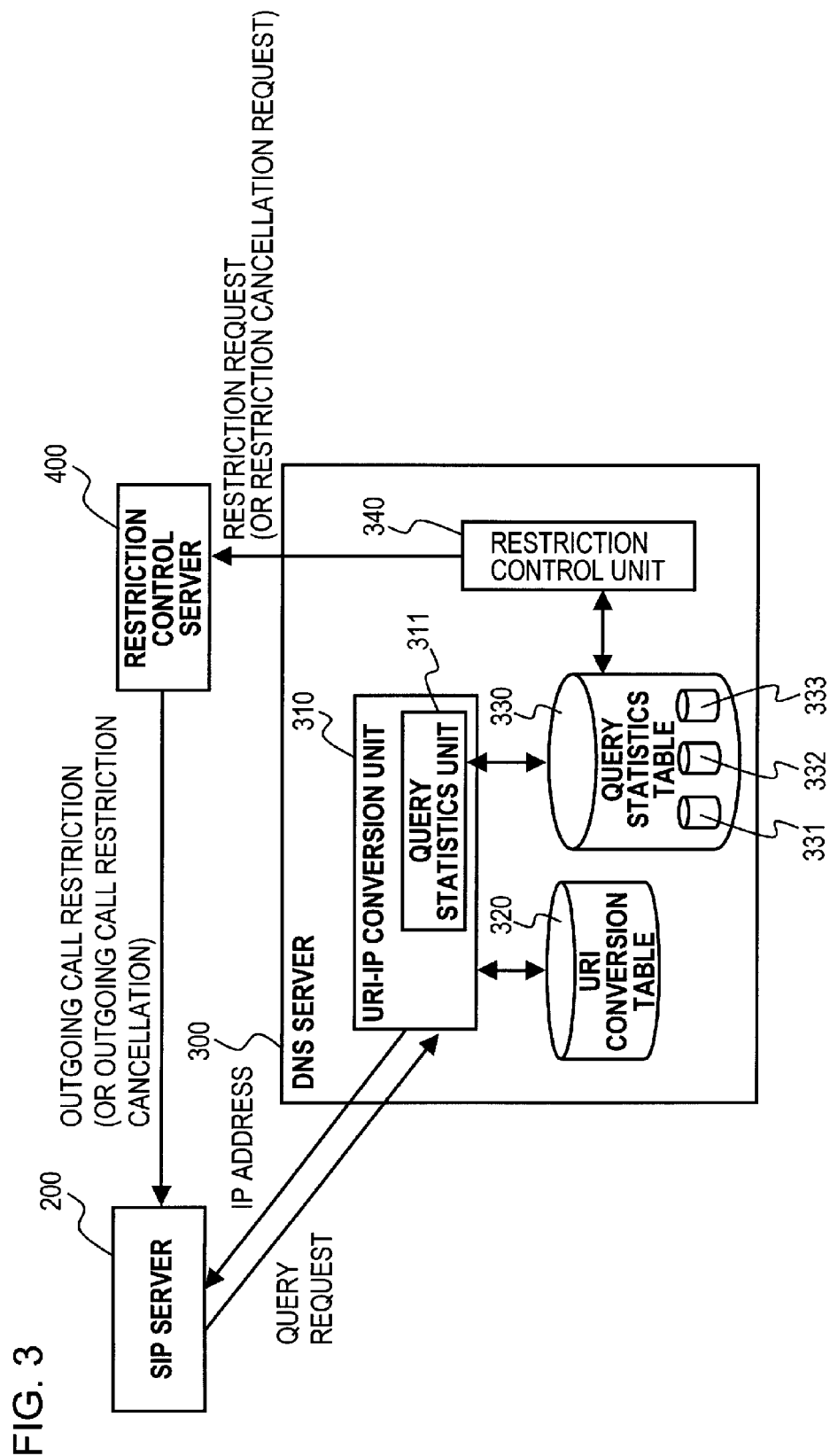
FIG. 3 illustrates an example of the configuration of a DNS server.

FIG. 3 illustrates an example of the configuration of the DNS server 300. The DNS server 300 is for example a server to convert a URI into an IP address. The DNS server 300 comprises a URI-IP conversion unit 310, URI conversion table 320, query statistics table 330, and restriction control unit 340.

In response to a query request requesting conversion from a URI to an IP address, the URI-IP conversion unit 310 acquires from the URI conversion table 320 an IP address corresponding to the URI included in the query. The URI-IP conversion unit 310 transmits the acquired IP address to the SIP server 200.

Further, the URI-IP conversion unit 310 comprises a query statistics unit 311. The query statistics unit 311 counts the number of query requests for prioritized telephone numbers among query requests from the SIP server 200, for example. The query statistics unit 311 stores the counted number of queries in the query statistics table 330.

The URI conversion table 320 stores URIs and IP addresses corresponding to the URIs.

The query statistics table 330 comprises first to third statistics tables 331 to 333. The first to third statistics tables 331 to 333 store, for example, the number of queries counted by the query statistics unit 311, and under-restriction flags indicating whether restriction is performed for each prioritized telephone number and non-prioritized telephone number.

Here, examples of the first to third statistics tables 331 to 333 are explained. FIG. 4 illustrates an example of a first statistics table 331, FIG. 5A and FIG. 5B illustrate examples of second statistics tables 332, and FIG. 6A and FIG. 6B illustrate examples of third statistics tables 333.

The first statistics table 331 is a table which stores, for example, states for each prioritized telephone number, indicating whether the prioritized telephone number is being restricted or not, and similar. As illustrated in FIG. 4, the first statistics table 331 includes, for each "prioritized telephone number", fields for a "restriction start threshold", "restriction cancellation threshold", "number of queries in the current cycle", and "under-restriction flag".

For example, the "restriction start threshold" stores threshold values indicating whether restriction is started for prioritized telephone numbers, and the "restriction cancellation threshold" stores threshold values indicating whether restriction is cancelled for a prioritized telephone number during restriction. The "restriction start threshold" and "restriction cancellation threshold" may be the same value; or, in order to prevent frequent repetition of restriction and restriction cancellation, the "restriction start threshold" may be a larger value than the "restriction cancellation threshold".

The "number of queries in the current cycle" stores the number of queries counted in a certain cycle interval by the query statistics unit 311, and the "under-restriction flag" stores flags indicating whether a prioritized telephone number is being restricted. As explained above, telephone numbers for restriction are non-prioritized telephone numbers; for a prioritized telephone number to be restricted indicates that, for example, a prioritized telephone number corresponding to a non-prioritized telephone number being restricted is being restricted. The correspondence relation between such prioritized telephone numbers and non-prioritized telephone numbers is for example given by the second statistics table 332.

As illustrated in FIG. 5A, the second statistics table 332 comprises the fields "prioritized telephone number", "non-prioritized telephone number", and "under-restriction flag". Here, "under-restriction flag" in the second statistics table 332 is a flag indicating, for example, whether, in a combination of a prioritized telephone number and a non-prioritized telephone number, the prioritized telephone number (or non-prioritized telephone number) is being restricted or not (or is an object for restriction or not). For example, "under-restriction flag" indicates, in a combination of a prioritized telephone number and a non-prioritized telephone number, whether the number of queries for the IP address corresponding to the prioritized telephone number is equal to or greater than the "restriction start threshold". By means of this combination, non-prioritized telephone numbers being restricted are indicated for a prioritized telephone number. As combinations of a prioritized telephone number and a non-prioritized telephone number, for example the second statistics table 332 stores all the combinations (nxo combinations) of the prioritized telephone numbers (n numbers) and the non-prioritized telephone numbers (o numbers) of the IVR 500.

In the example of FIG. 5B, for a prioritized telephone number "Na_1", three non-prioritized telephone numbers "Nb_1", "Nb_2", and "Nb_3" are non-prioritized telephone numbers for restriction; it is indicated that the prioritized telephone number "Na_1" is "being restricted", and that the corresponding non-prioritized telephone numbers "Nb_1", "Nb_2" and "Nb_3" are also restricted. For a single prioritized telephone number, there are one or a plurality of restricted non-prioritized telephone numbers; when one prioritized telephone number is "being restricted", the corresponding one or plurality of non-prioritized telephone numbers are telephone numbers for restriction.

As illustrated in FIG. 6A, the third statistics table 333 comprises the fields "non-prioritized telephone number" and an "under-restriction flag" which indicates whether the non-prioritized telephone number is being restricted. FIG. 6B illustrates an example of a third statistics table 333. For example, the query statistics unit 311 sets to "ON" the "under-restriction flags" in the third statistics table 333 as well for non-prioritized telephone numbers for which the "under-restriction flags" are "ON" in the second statistics table 332. The non-prioritized telephone numbers for restriction are specified using the third statistics table 333.

Returning to FIG. 3, the restriction control unit 340 specifies non-prioritized telephone numbers for which the "under-restriction flag" is "ON" in the third statistics table 333, and transmits restriction requests to the restriction control server 400. Further, the restriction control unit 340 takes non-prioritized telephone numbers the "under-restriction flags" for which in the third statistics table 333 have changed from "ON" to "OFF" to be telephone numbers for restriction cancellation, and transmits restriction cancellation requests including these telephone numbers to the restriction control server 400.

Figure 7:
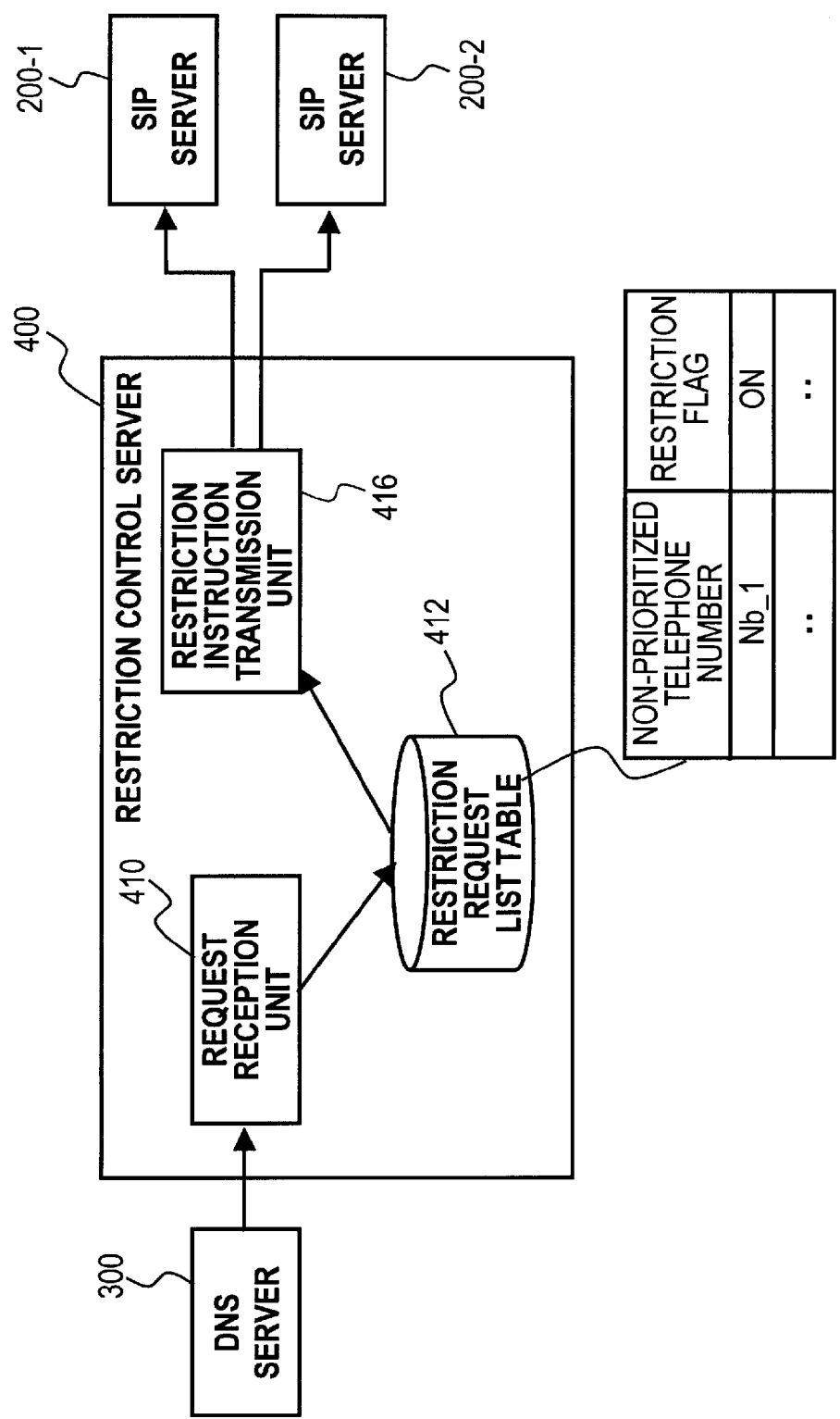
FIG. 7 illustrates an example of the configuration of a restriction control server.

FIG. 7 illustrates an example of the configuration of a restriction control server 400. The restriction control server 400, for example, transmits to an SIP server 200 outgoing call restriction requests or outgoing call restriction cancellation requests including non-prioritized telephone numbers for restriction or for restriction cancellation, based on restriction requests or restriction cancellation requests. The restriction control server 400 comprises a request reception unit 410, restriction request list table 412, restriction value calculation unit 414, and restriction instruction transmission unit 416.

The request reception unit 410 receives outgoing call restriction requests and outgoing call restriction cancellation requests transmitted from the DNS server 300, and stores information related to this restriction or this restriction cancellation in the restriction request list table 412. For example, upon receiving a outgoing call restriction request, the request reception unit 410 stores the non-prioritized telephone number included in the restriction request in the restriction request list table 412, and also stores a flag indicating that the non-prioritized telephone number is being restricted. On the other hand, upon receiving a outgoing call restriction cancellation request, the request reception unit 410 stores a flag indicating that restriction has been cancelled for the non-prioritized telephone number included in the restriction cancellation request.

The restriction request list table 412 stores non-prioritized telephone numbers, and the above-described flags indicating whether restriction is being performed (or whether restriction has been cancelled).

The restriction instruction transmission unit 416 periodically reads out from the restriction request list table 412 the non-prioritized telephone numbers which are for restriction, and when a flag indicating that a non-prioritized telephone number is being restricted is stored, transmits a restriction instruction to the SIP server 200. Further, when a flag indicating that restriction has been canceled for the non-prioritized telephone number, the restriction instruction transmission unit 416 transmits a restriction cancellation instruction to the SIP server 200. Restriction instructions and restriction cancellation instructions also include the non-prioritized telephone number in question.

(Operation Examples)

Next, examples of operation in the communication system 10 are explained. First, an example of operation of the communication system 10 prior to the start of restriction is explained, followed by an example of operation at the start of restriction and during restriction, and finally an example of operation during restriction cancellation and after restriction cancellation.

As an example of operation prior to the start of restriction, for example as illustrated in FIG. 1, suppose that a telephone call by a non-prioritized telephone number "Nb_1" is performed via telephone set 100-3, and that a telephone call by a prioritized telephone number "Na_1" is performed via telephone set 100-4. Further, suppose that in the example of operation during restriction also, for example as illustrated in FIG. 1, the non-prioritized telephone number "Nb_2" is a non-prioritized telephone number for restriction, and this telephone call is performed via telephone set 100-1, and that a telephone call by the prioritized telephone number "Na_2" is performed via telephone set 100-2. Implementation is possible without the combinations of telephone numbers and telephone sets 100-1 to 100-4 illustrated in FIG. 1, and it is supposed that telephone calls can be made by both prioritized telephone numbers and non-prioritized telephone numbers from any telephone set 100-1 to 100-4.

Figure 8A:
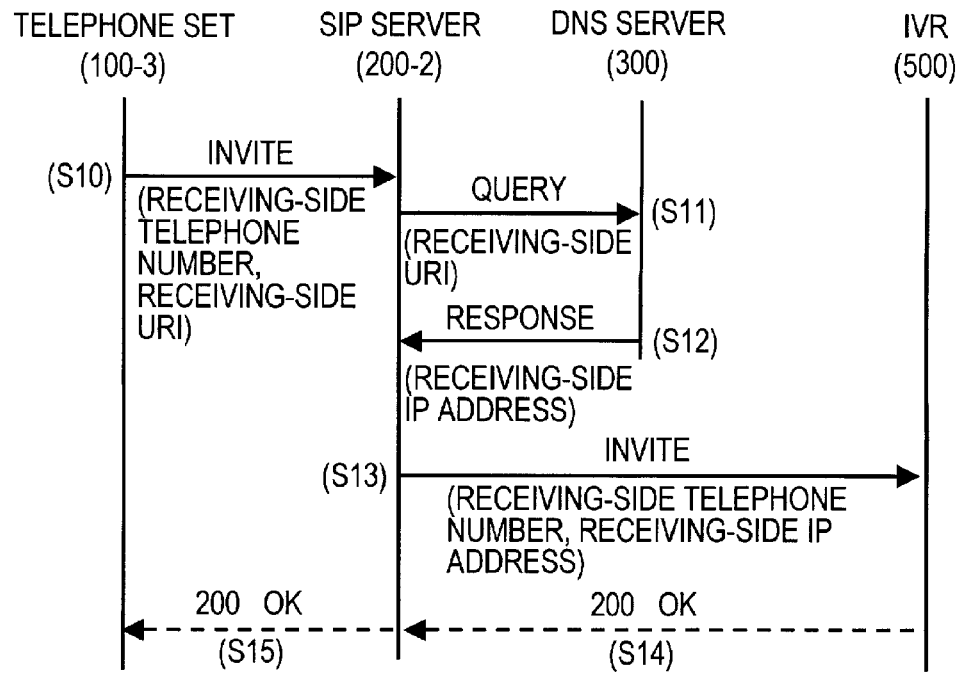
FIG. 8A and FIG. 8B are sequence diagrams illustrating examples of operation prior to the start of restriction.
Figure 8B:
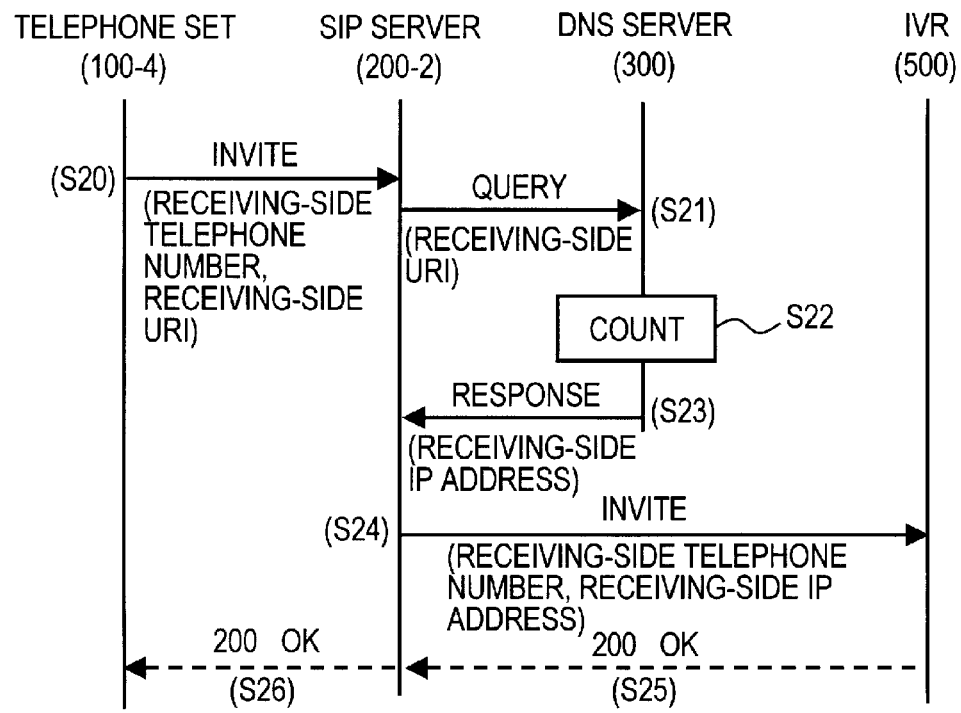

FIG. 8A and FIG. 8B illustrate examples of operation of the communication system 10 prior to restriction start; FIG. 8A is an example of operation for non-prioritized telephone number "Nb_1", and FIG. 8B is a sequence diagram illustrating an example of operation for the prioritized telephone number "Na_1".

As illustrated in FIG. 8A, when the telephone set 100-3 starts a telephone call to the non-prioritized telephone number "Nb_1", a telephone call request SIP message (for example, an INVITE message) is transmitted to the SIP server 200-2 (S10). The telephone set 100-3 transmits an INVITE message including for example the telephone number "Nb_1" of the IVR 500 which is on the receiving side, and the URI of the IVR 500.

The SIP server 200-2 receives the INVITE message, confirms whether the URI included in the message is stored in the connected session storage unit 214, and if not stored, queries the DNS server 300 for the IP address (S11). For example, the session management unit 212 accesses the connected session storage unit 214, and confirms whether the same session ID as the session ID included in the INVITE message, and the corresponding IP address, are stored. And, if the same session ID is not present or the IP address is not stored, the session management unit 212 requests acquisition of the IP address corresponding to the URI by the DNS query unit 216. The DNS query unit 216 queries the DNS server 300 for IP address acquisition.

Next, the DNS server 300 transmits the IP address corresponding to the URI to the SIP server 200-2 (S12). For example, the URI-IP conversion unit 310 reads out from the URI conversion table 320 and transmits the IP address corresponding to the URI included in the query. For example, because the IP address and similar of the SIP server 200-2 is included as the transmission source address of the query received in the processing of S11, by taking this address to be the transmission destination address, the URI-IP conversion unit 310 can transmit a response message to the SIP server 200-2.

Next, the SIP server 200-2 transmits an INVITE message including the acquired IP address and the non-prioritized telephone number "Nb_1" to the IVR 500 (S13). For example, the session management unit 212 stores the IP address acquired from the DNS server 300 in the connected session storage unit 214, and also outputs the IP address to the SIP message reception unit 210. The SIP message reception unit 210 issues a request to the SIP message transmission unit 218 to transmit an INVITE message with this IP address as the destination, and by this means the INVITE message is transmitted to the IVR 500.

Next, in response to the received INVITE message, the IVR 500 transmits a response message (for example, a "200 OK" message) to the SIP server 200-2 (S14), and the SIP server 200-2 transfers this to the telephone set 100-3 (S15). For example, the message transmitted from the IVR 500 includes a session ID, and the session management unit 212 confirms whether the same session ID is stored in the connected session storage unit 214. If the same session ID is stored, the session management unit 212 outputs this information to the SIP message reception unit 210, and the SIP message reception unit 210 outputs the received SIP message (response message) to the SIP message transmission unit 218. By this means, the SIP message transmission unit 218 transmits the response message to the telephone set 100-3.

On the other hand, operation prior to the start of restriction of the prioritized telephone number "Na_1" is as follows.

That is, as illustrated in FIG. 8B, the telephone set 100-4 transmits to the SIP server 200-2 an INVITE message including the prioritized telephone number "Na_1" and URI of the IVR 500 (S20).

Next, with respect to the URI included in the received INVITE message, the SIP server 200-2 queries the DNS server 300 for the IP address (S21). For example, similarly to above-described processing (S11), the session management unit 212 and DNS query unit 216 perform the query for the IP address.

Next, the DNS server 300 confirms, for the URI included in the query, whether prioritized telephone numbers are included in the URI, and if included, counts the prioritized telephone numbers (S22). For example, the query statistics unit 311 extracts a telephone number from the received URI, and if the telephone number is the same as a prioritized telephone number stored in the first statistics table 331, increments the number of prioritized telephone number queries.

Next, the DNS server 300 responds to the SIP server 200-2 with the IP address of the IVR 500 (S23). For example, similarly to above-described processing (S12), the URI-IP conversion unit 310 reads out the IP address corresponding to the received URI from the URI conversion table 320 and transmits the IP address to the SIP server 200-2.

Next, the SIP server 200-2 transmits to the IVR 500 an INVITE message, including as destination the IP address acquired from the DNS server 300 (S24). For example, similarly to above-described processing (S13), an INVITE message with the IP address as destination is transmitted to the IVR 500 by means of the session management unit 212 and the SIP message reception unit 210.

Next, the IVR 500 transmits to the SIP server 200-2 a message in response to the received INVITE message (for example, a "200 OK" message) (S25).

Next, the SIP server 200-2 transmits the received "200 OK" message to the telephone set 100-4 (S26). For example, similarly to above-described processing (S15), the session management unit 212 performs processing to confirm whether the session ID is stored in the connected session storage unit 214, and the "200 OK" message is transmitted from the SIP message transmission unit 218 to the telephone set 100-4.

Figure 9:
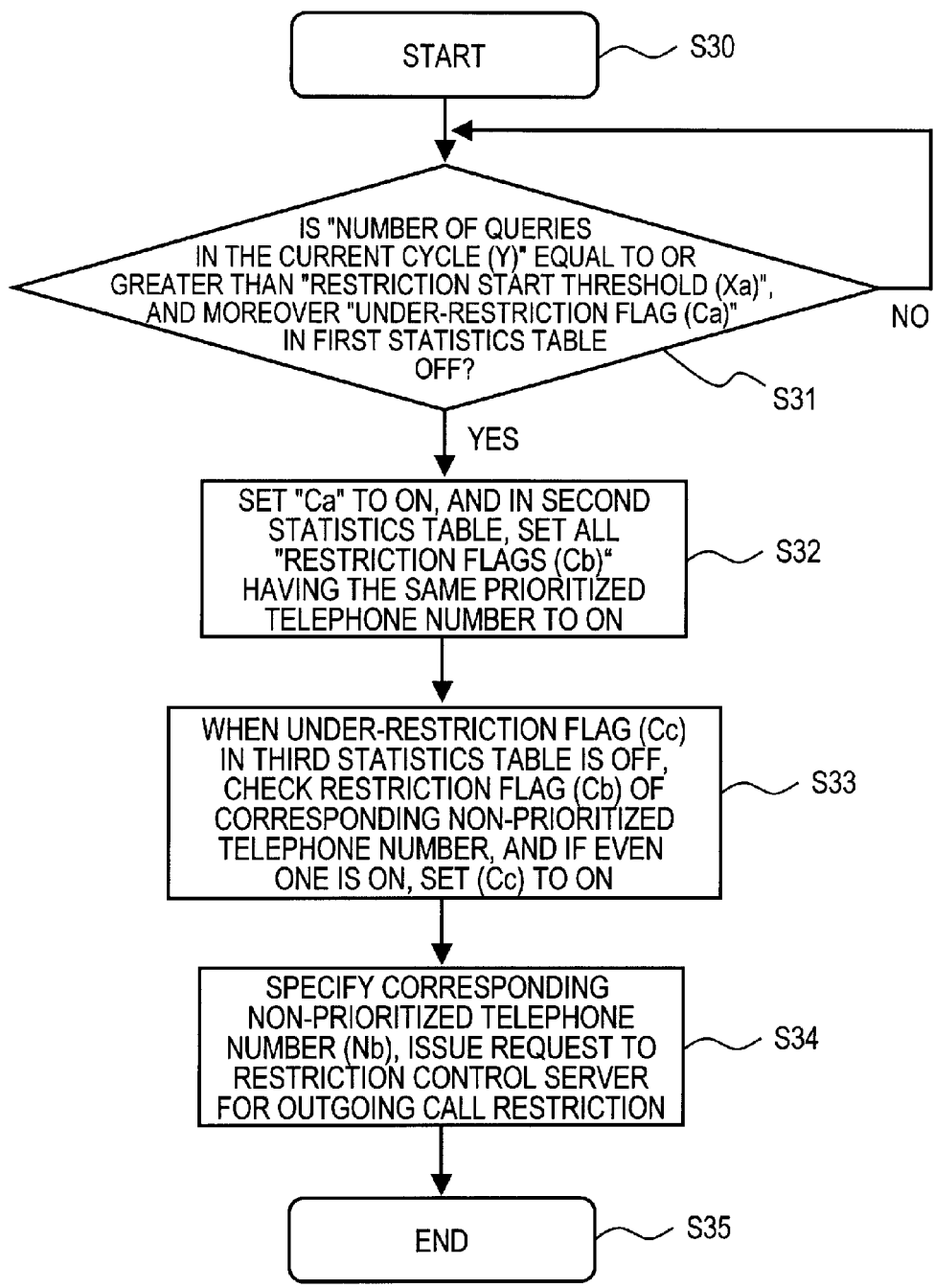
FIG. 9 is a flowchart illustrating an example of operation at the start of restriction.

For example, by means of processing like that above, the DNS server 300 counts the number of prioritized telephone number queries. Next, the DNS server 300 judges whether to start restriction of a non-prioritized telephone number based on the first to third statistics tables 331 to 333. FIG. 9 is a flowchart illustrating an example of operation at the start of restriction. The DNS server 300 stores the number of queries for prioritized telephone numbers in a certain cycle interval in the first statistics table 331, and performs the processing illustrated in FIG. 9 in the next cycle interval.

The DNS server 300, upon starting processing (S30), confirms in the first statistics table 331 whether the "number of queries in the current cycle" for a certain prioritized telephone number is equal to or greater than the "restriction start threshold", and moreover whether the "under-restriction flag" for the prioritized telephone number is "OFF" (S31). The DNS server 300 confirms that, for example, when the number of queries for a certain prioritized telephone number is equal to or greater than the "restriction start threshold" and restriction is possible, and that moreover this prioritized telephone number was not a prioritized telephone number under restriction in the prior cycle interval. For example, the query statistics unit 311 compares the "number of queries in the current cycle" and "restriction start threshold" from the first statistics table 331, and writes the result to the "under-restriction flag" or performs similar action to perform the processing of S31.

When the "number of queries in the current cycle" is smaller than the "restriction start threshold" for a certain prioritized telephone number, or when the "number of queries in the current cycle" is equal to or greater than the "restriction start threshold" but the "under-restriction flag" is "ON" (No in S31), the DNS server 300 repeats the processing of S31. If the number of queries for a certain prioritized telephone number is smaller than the "restriction start threshold", restriction is not performed, and if the number of queries is equal to or greater than the "restriction start threshold", and if restriction is already being performed in the previous cycle interval, this is continued.

On the other hand, when there is a prioritized telephone number for which the "number of queries in the current cycle" is equal to or greater than the "restriction start threshold", and moreover the "under-restriction flag" for the number is "OFF" (Yes in S31), the DNS server 300 sets the "under-restriction flag" to "ON" (S32). Also, the DNS server 300 sets to "ON" an "under-restriction flag" in the second statistics table 332 having the same prioritized telephone number as the prioritized telephone number for which the "under-restriction flag" was set to "ON" (S32). For example, when the "under-restriction flag" for the prioritized telephone number "Na_1" in the first statistics table 331 is set to "ON", the query statistics unit 311 sets the "under-restriction flag" corresponding to the prioritized telephone number "Na_1" in the second statistics table 332 to "ON" (see for example FIG. 5B).

Next, when the "under-restriction flag" of a corresponding non-prioritized telephone number in the third statistics table 333 is "OFF", the DNS server 300 checks the "under-restriction flag" of the corresponding non-prioritized telephone number in the second statistics table 332. And, if in the second statistics table 332 there is even one flag which is "ON", the DNS server 300 sets the "under-restriction flag" in the third statistics table 333 to "ON" (S33). For example, the query statistics unit 311 sets the "under-restriction flag" in the third statistics table 333 to "ON" for the non-prioritized telephone numbers "Nb_1", "Nb_2", "Nb_3" corresponding to the prioritized telephone number "Na_1" for which the "under-restriction flag" in the second statistics table 332 has been set to "ON". Also, 'when the "under-restriction flag" of a corresponding non-prioritized telephone number in the third statistics table 333 is "OFF"' means that, for example, the non-prioritized telephone number was not under restriction in the prior cycle; when the number is under restriction, the restriction is maintained without change (remains at "ON").

Next, based on the third statistics table 333, the DNS server 300 specifies non-prioritized telephone numbers for restriction and issues a request for outgoing call restriction to the restriction control server 400 (S34). For example, the restriction control unit 340 references the third statistics table 333, and requests restriction, with as objects for restriction the non-prioritized telephone numbers "Nb_1", "Nb_2", "Nb_3" for which the "under-restriction flag" is "ON".

And, the DNS server 300 ends the series of processing (S35). Through the above processing, the DNS server 300 identifies non-prioritized telephone numbers for restriction (for example, "Nb_1", "Nb_2", "Nb_3"), and issues a request to the restriction control server 400 for restriction of the non-prioritized telephone numbers.

Figure 10A:
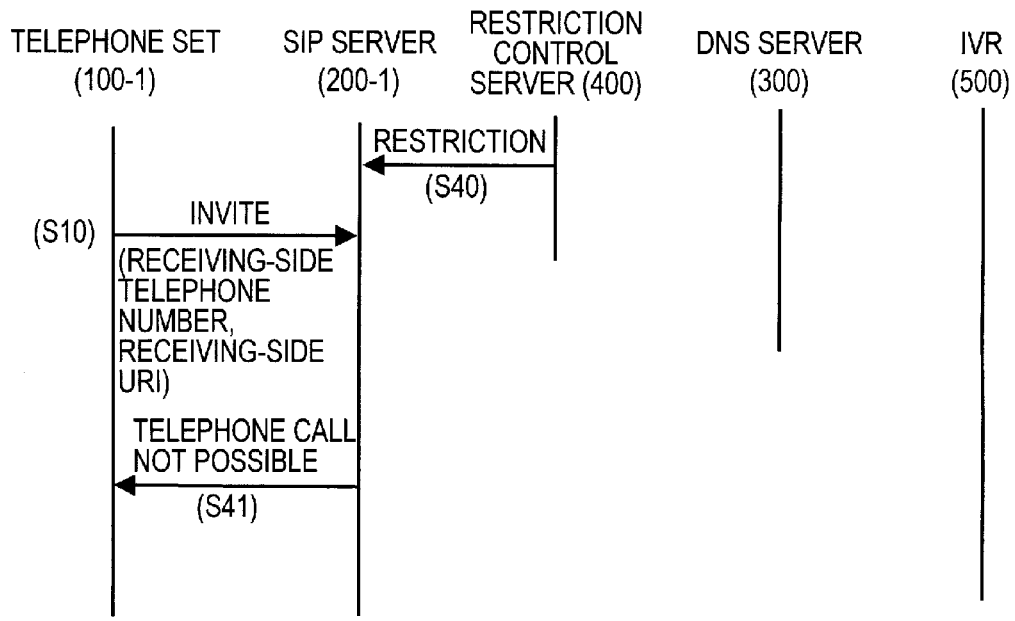
FIG. 10A and FIG. 10B are sequence diagrams illustrating examples of operation during restriction.
Figure 10B:
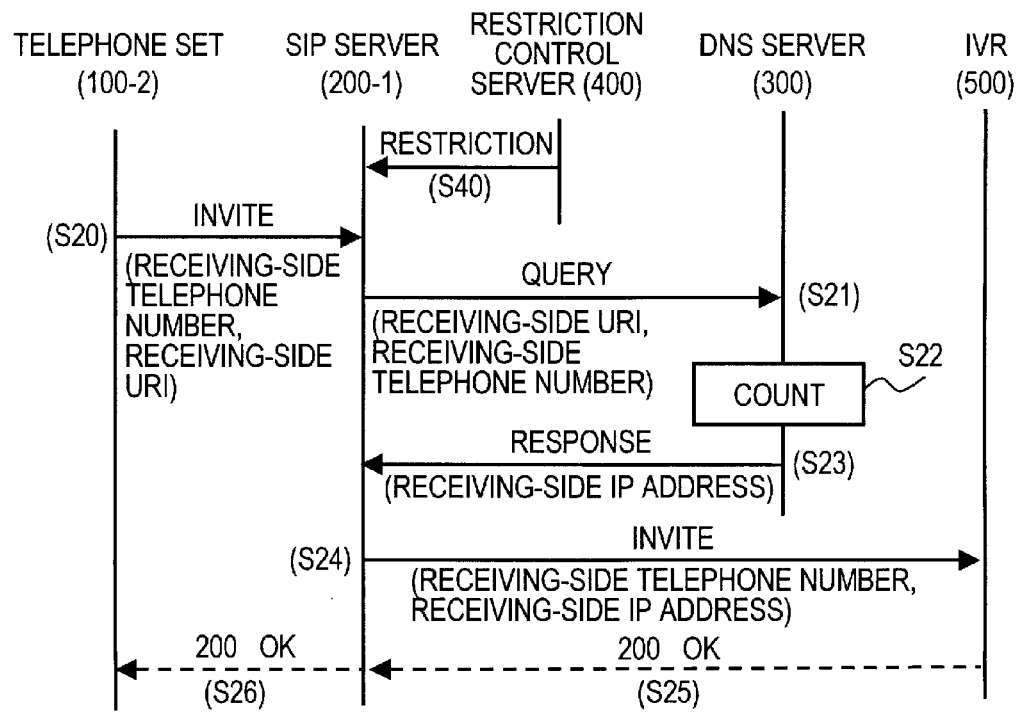

FIG. 10A and FIG. 10B are sequence diagrams illustrating examples of operation in the communication system 10 after the start of restriction; FIG. 10A and FIG. 10B respectively illustrate examples of operation for a non-prioritized telephone number after the start of restriction and for a prioritized telephone number after the start of restriction.

In operation for a non-prioritized telephone number after the start of restriction, first the restriction control server 400 transmits a restriction request for the non-prioritized telephone number for restriction to the SIP servers 200-1, 200-2 (S40). For example, the restriction request reception unit 410, upon receiving a restriction request from the DNS server 300, stores the non-prioritized telephone numbers included in the restriction request (for example, "Nb_1", "Nb_2", "Nb_3") in the restriction request list table 412. The restriction instruction transmission unit 416 reads out the non-prioritized telephone numbers (for example, "Nb_1", "Nb_2", "Nb_3") for restriction from the restriction request list table 412, and transmits these to the SIP servers 200-1, 200-2. Further, the session management units 212 of the SIP servers 200-1, 200-2, upon receiving the non-prioritized telephone numbers (for example, "Nb_1", "Nb_2", "Nb_3") for restriction from the restriction control server 400, stores these in the connected session storage unit 214.

Next, the telephone set 100-1 transmits a SIP message which is a telephone call request (for example, an INVITE message) to the IVR 500, specifying a non-prioritized telephone number for restriction (S10). For example, the telephone set 100-1 transmits an INVITE message including the non-prioritized telephone number "Nb_2".

Next, upon receiving a SIP message including a non-prioritized telephone number for restriction, the SIP server 200-2 transmits to the telephone set 100-1 a SIP message indicating that a telephone call to this number is not possible (S41). For example, the session management unit 212 references the connected session storage unit 214 and confirms whether a non-prioritized telephone number "Nb_2" included in the SIP message received by the SIP message reception unit 210 is an object for restriction. And, when the non-prioritized telephone number "Nb_2" received is stored in the connected session storage unit 214 as an object for restriction, the session management unit 212 issues a request to the SIP message reception unit 210 for transmission of a SIP message indicating a telephone call is not possible, and this SIP message is transmitted to the telephone set 100-1. For example, the SIP server 200-2 may transmit audio (or outgoing call restriction recording) to the telephone set 100-1 which had transmitted the SIP message, indicating that outgoing call is being restricted.

On the other hand, operation for a prioritized telephone number corresponding to a restricted non-prioritized telephone number is similar to that prior to restriction (for example FIG. 8B). That is, as illustrated in FIG. 10B, the restriction control server 400 transmits non-prioritized telephone numbers for restriction to the SIP servers 200-1, 200-2 (S40). And, even upon receiving a SIP message for the IVR 500 specifying a prioritized telephone number, because there is no number stored as a non-prioritized telephone number for restriction in the connected session storage unit 214, the SIP server 200-1 queries the DNS server 300 for the IP address and performs similar processing (S21 to S26). By this means, even when a corresponding non-prioritized telephone number is restricted, a telephone call can be made using a prioritized telephone number.

As explained above, because in this communication system 10 non-prioritized telephone numbers are restricted by means of a "restriction start threshold" before telephone numbers (or communication paths) to an IVR 500 enter a congested state, the occurrence of congestion can be suppressed in advance. Hence when for example a plurality of telephone lines are connected in the IVR 500, restriction is performed by means of the "restriction start threshold" before all the telephone lines are used, telephone lines corresponding to telephone calls for prioritized telephone numbers are given priority, and occupation of telephone lines by non-prioritized telephone numbers is prevented. For example, the "restriction start threshold" can be made a much smaller number than the number of queries at which congestion occurs, taking into consideration other prioritized telephone numbers or the number of telephone lines which can be connected, or other parameters.

Further, in this communication system 10, when restriction is applied to non-prioritized telephone numbers, telephone calls to prioritized telephone numbers can be made with no difference compared with before restriction. Hence for example the disaster emergency message service, and other telephone calls with a high priority level compared with other calls can continue to be made.

Also, in this communication system 10, restriction control is performed in the IVR 500 which is the receiving side of telephone calls by division into non-prioritized telephone numbers and prioritized telephone numbers. Hence restriction control can be performed for telephone numbers on the receiving side.

Figure 11:
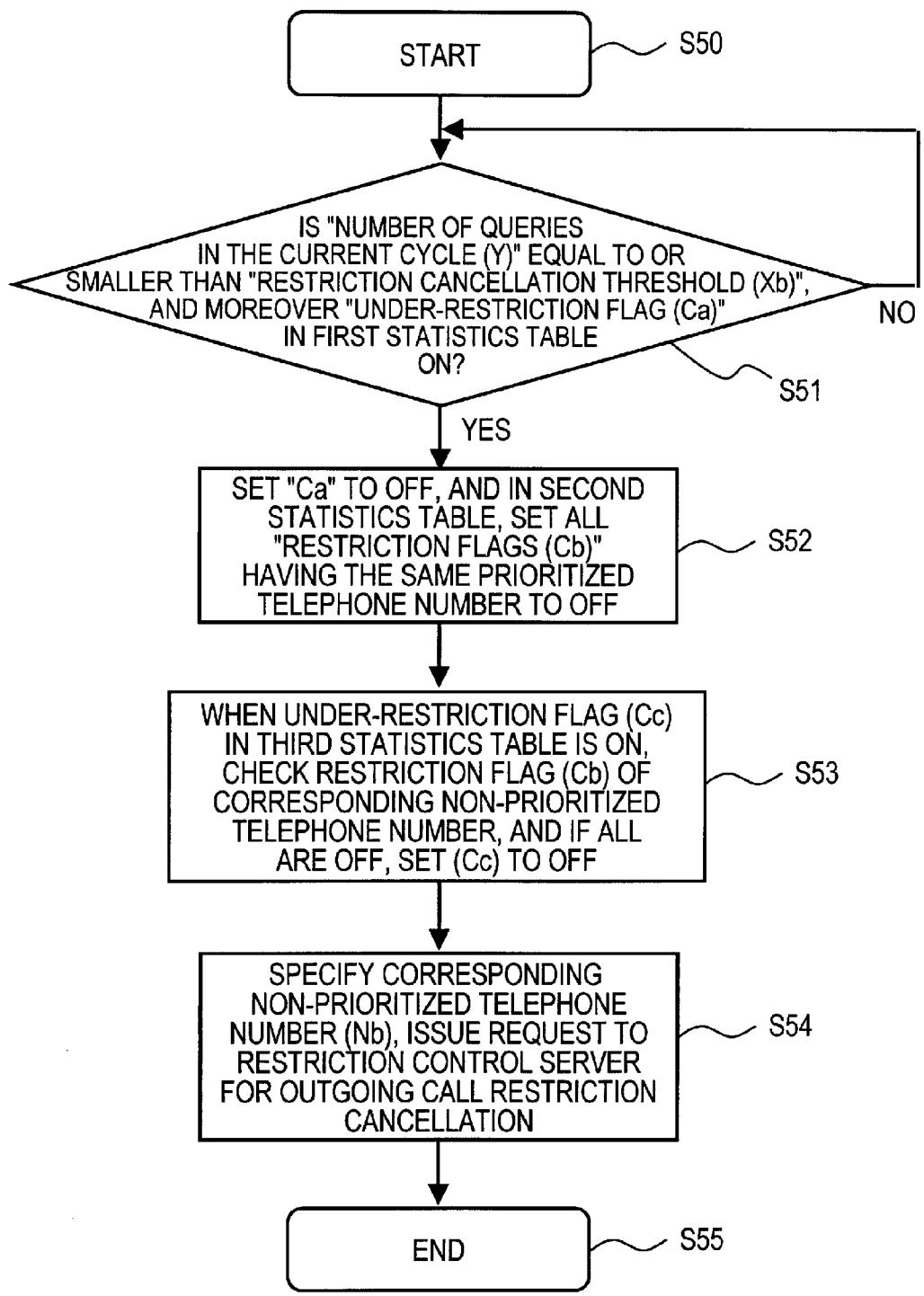
FIG. 11 is a flowchart illustrating an example of operation during restriction cancellation.

In this communication system 10, while restriction of non-prioritized telephone numbers is being performed, if the number of queries for prioritized telephone numbers becomes equal to or less than a constant number, restriction can be canceled, to transition to the state prior to restriction. FIG. 11 is a flowchart illustrating an example of operation in restriction cancellation. In the operation example illustrated in FIG. 11, similarly to an example of operation in a case in which restriction is started (for example FIG. 9), it is supposed that in a certain cycle interval the number of queries is stored in the "number of queries in the current cycle" in the first statistics table 331, and that after transition to the next cycle this processing is started.

Upon starting restriction cancellation processing (S50), the DNS server 300 confirms that, in the first statistics table 331, the "number of queries in the current cycle" is equal to or less than the "restriction cancellation threshold" for a certain prioritized telephone number, and moreover confirms whether the "under-restriction flag" for the prioritized telephone number is "ON" (S51). For example, the query statistics unit 311 searches for a prioritized telephone number in the first statistics table 331 for which the "under-restriction flag" is "ON", and for this prioritized telephone number compares the "number of queries in the current cycle" and the "restriction cancellation threshold".

And, when for a certain prioritized telephone number the "number of queries in the current cycle" is greater than the "restriction cancellation threshold" for a certain prioritized telephone number (No in S51), the DNS server 300 repeats the processing of S51. Further, even when the "number of queries in the current cycle" is equal to or less than the "restriction cancellation threshold" for a certain prioritized telephone number, if the "under-restriction flag" is "OFF" (No in S51), the DNS server 300 repeats the processing of S51. For example, when for a certain prioritized telephone number the number of queries is greater than the "restriction cancellation threshold", the number is in any case not an object for restriction cancellation, and so the DNS server 300 maintains restriction.

On the other hand, when in the first statistics table 331 there is a prioritized telephone number for which the "under-restriction flag" is "ON", and the "number of queries in the current cycle" is equal to or less than the "restriction cancellation threshold" (Yes in S51), the DNS server 300 sets the "under-restriction flag" to "OFF" (S52). And, in the second statistics table 332, the DNS server 300 sets to "OFF" all "under-restriction flags" having the same prioritized telephone number set to OFF (S52). For example, when the number of queries for a prioritized telephone number under restriction becomes equal to or less than the "restriction cancellation threshold", the query statistics unit 311 sets the "under-restriction flag" in the first statistics table 331 to "OFF", so as to remove the number from objects for restriction.

Next, when in the third statistics table 333 the under-restriction flag for a corresponding non-prioritized telephone number is "ON", the DNS server 300 checks the "under-restriction flag" in the second statistics table 332 for the corresponding non-prioritized telephone numbers. And, when the flag is "OFF" for all of the corresponding non-prioritized telephone numbers in the second statistics table 332, the DNS server 300 sets to "OFF" the "under-restriction flag" for the non-prioritized telephone numbers in the third statistics table 333 (S53).

Figures 12A, 12B, 12C:
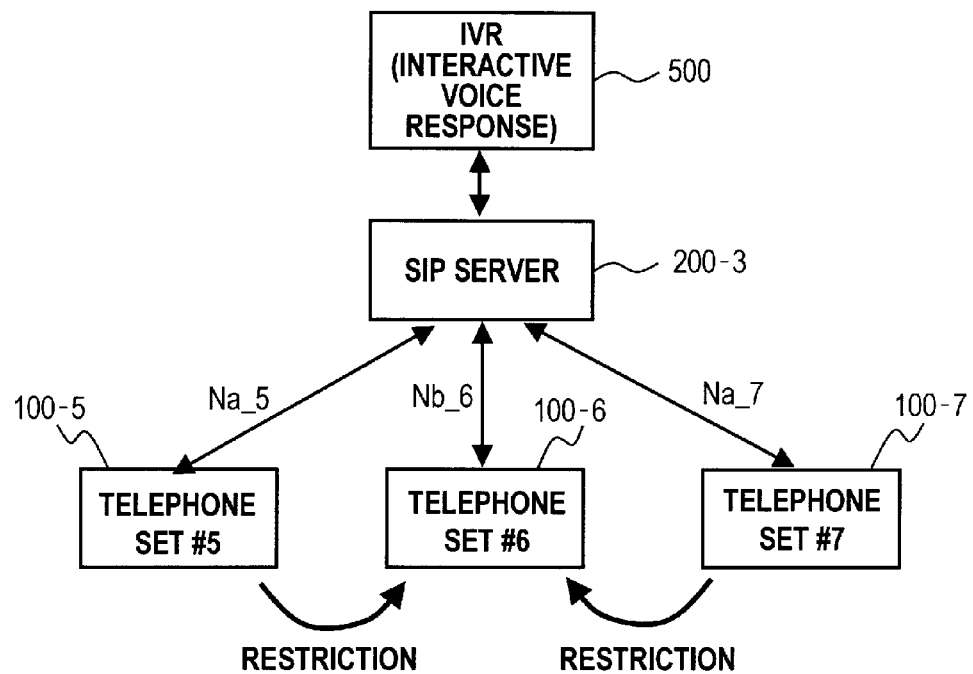
FIG. 12A, FIG. 12B, and FIG. 12C respectively illustrate an example of an object of restriction, an example of a second statistics table, and an example of a third statistics table.

For example, as illustrated in FIG. 12A, consider a case in which two prioritized telephone numbers "Na_5" and "Na_7" both have as an object for restriction the non-prioritized telephone number "Nb_6". In this case, when the prioritized telephone number "Na_5" is equal to or below the restriction cancellation threshold, and the other prioritized telephone number "Na_6" is not equal to or below the restriction cancellation threshold, the query statistics unit 311 sets the "under-restriction flag" corresponding to the prioritized telephone number "Na_5" to "OFF" (see for example FIG. 12B). Further, the query statistics unit 311 maintains the "under-restriction flag" corresponding to the prioritized telephone number "Na_7" unchanged at "ON". In this case, a condition for setting the "under-restriction flag" for the non-prioritized telephone number "Nb_6" to "OFF" is that the "under-restriction flags" in the second statistics table 332 all be "OFF" for the corresponding prioritized telephone numbers "Na_5" and "Na_7" (see for example FIG. 12C). This processing S53 indicates processing, in a case in which a non-prioritized telephone number is an object for restriction from a plurality of prioritized telephone numbers, to for example set the "under-restriction flag" in the third statistics table 333 to "OFF".

Here, 'when in the third statistics table 333 the under-restriction flag for a corresponding non-prioritized telephone number is "ON"' indicates that, for example, in the previous cycle the non-prioritized telephone number was an object for restriction, and when not an object for restriction (when "OFF"), is not to be an object for restriction cancellation.

Returning to FIG. 11, next the DNS server 300 takes a non-prioritized telephone number for which the "under-restriction flag" in the third statistics table 333 is set to "OFF" to be a number for restriction cancellation, and issues a request for restriction cancellation to the restriction control server 400 (S54). For example, the restriction control unit 340 references the third statistics table 333, and transmits a restriction cancellation request including the non-prioritized telephone number for which the "under-restriction flag" has been set to "OFF".

And, the DNS server 300 ends the series of processing (S55). By this means, the DNS server 300 identifies non-prioritized telephone numbers which are objects for restriction cancellation, and transmits restriction cancellation requests to the restriction control server 400.

Figure 13A:
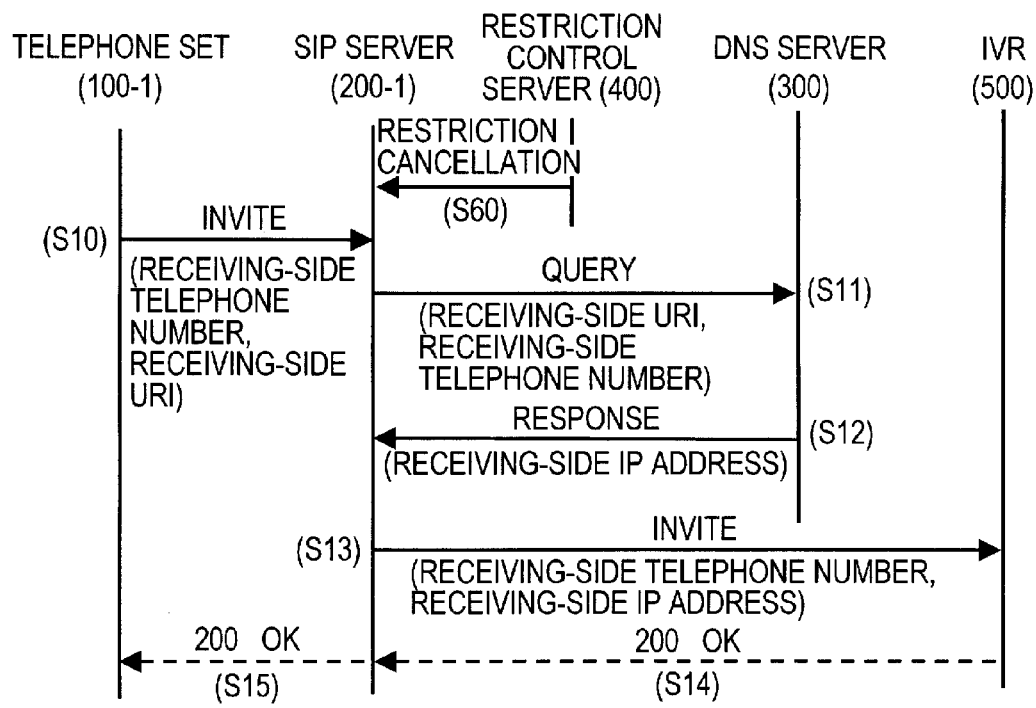
FIG. 13A and FIG. 13B are sequence diagrams illustrating examples of operation after restriction cancellation.
Figure 13B:
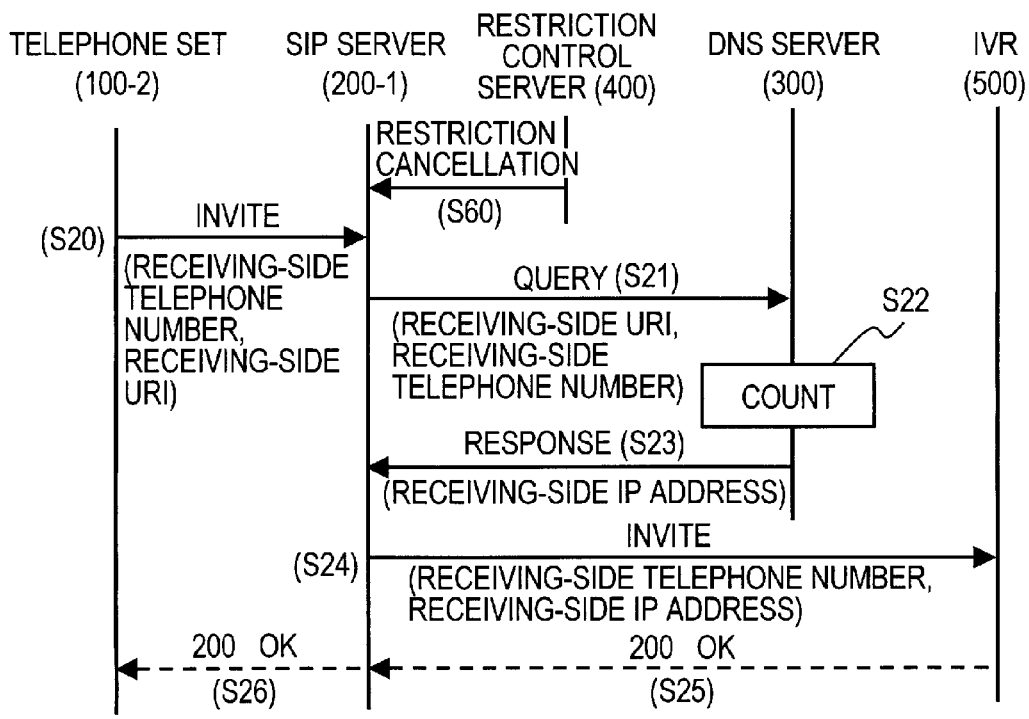

FIG. 13A and FIG. 13B are sequence diagrams illustrating examples of operation of the communication system 10 after restriction cancellation; FIG. 13A and FIG. 13B respectively illustrate an example of operation of the communication system 10 for a non-prioritized telephone number after restriction cancellation, and an example of operation of the communication system 10 for a prioritized telephone number after restriction cancellation.

First, the restriction control server 400 transmits to the SIP servers 200-1, 200-2 a restriction cancellation request for a non-prioritized telephone number which is an object for restriction cancellation, based on a restriction cancellation request transmitted from the DNS server 300 (S60). For example, the request reception unit 410 of the restriction control server 400 receives a restriction cancellation request, and stores in the restriction request list table 412 the information that restriction has been cancelled for a non-prioritized telephone number which had been restricted. The restriction instruction transmission unit 416 reads this out from the restriction request list table 412, and transmits to the SIP servers 200-1, 200-2 a restriction cancellation request including the read-out non-prioritized telephone number. Further, the session management units 212 of the SIP servers 200-1, 200-2, upon receiving the non-prioritized telephone number for restriction cancellation from the restriction control server 400, store the non-prioritized telephone number in the connected session management unit 214.

Next, the telephone set 100-1 transmits an INVITE message including the non-prioritized telephone number for restriction cancellation (S10).

Because the non-prioritized telephone number is an non-prioritized telephone number for which restriction has been cancelled, the SIP server 200-1, upon receiving this message, queries the DNS server 300 for the IP address corresponding to the URI without performing any restriction in particular (S11). For example, the session management unit 212 references the connected session storage unit 214, and confirms whether the same non-prioritized telephone number as the non-prioritized telephone number included in the INVITE message is stored as a non-prioritized telephone number with restriction cancelled. And, if so stored, the session management unit 212 queries the DNS query unit 216 and similar. However, if the same non-prioritized telephone number is not stored as an non-prioritized telephone number for restriction cancellation, the session management unit 212 accesses the connected session storage unit 214 and confirms whether for example the number is restricted or not. Subsequently processing is similar to the example of operation prior to restriction (S12 to S15).

On the other hand, as illustrated in FIG. 13A, in an example of operation for a prioritized telephone number, first the restriction control server 400 transmits a restriction cancellation request to the SIP server 200-1 (S60), after which operation similar to that prior to restriction start (for example FIG. 8B) is performed. Because objects for restriction are non-prioritized telephone numbers, even when restriction cancellation is performed, operation with respect to a prioritized telephone number for example is the same as prior to restriction (S20 to S26).

(Other Examples)

Figure 14:
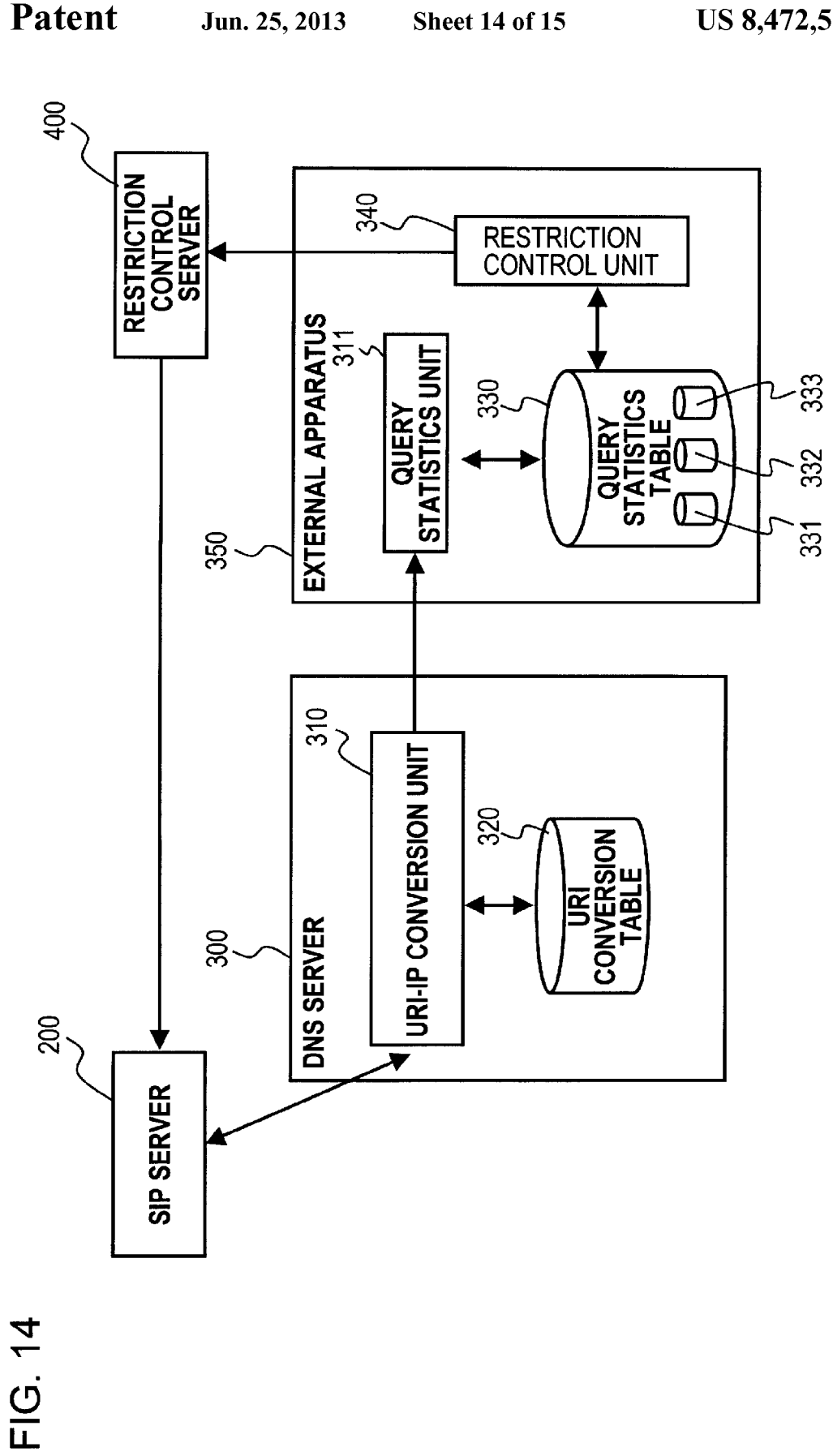
FIG. 14 illustrates an example of the configuration of an external apparatus.

In the above-described examples, the explanation assumed that the DNS server 300 comprised a query statistics unit 311, query statistics table 330, and restriction control unit 340. But as for example illustrated in FIG. 14, an external apparatus 350 may be installed outside the DNS server 300, and the external apparatus 350 may comprise the query statistics unit 311, query statistics table 330, and restriction control unit 340. The URI-IP conversion unit 310, upon receiving an IP address query request from a SIP server 200, outputs the query request to the query statistics unit 311, and the query statistics unit 311 counts in a certain cycle interval the prioritized telephone numbers included in the requests, and stores the result in the first statistics table 331. Subsequently execution can be similar to that of the above-described examples, and the restriction control unit 340, by transmitting to the restriction control server 400 requests including non-prioritized telephone numbers for restriction or for restriction cancellation, can perform restriction or restriction cancellation.

Figure 15:
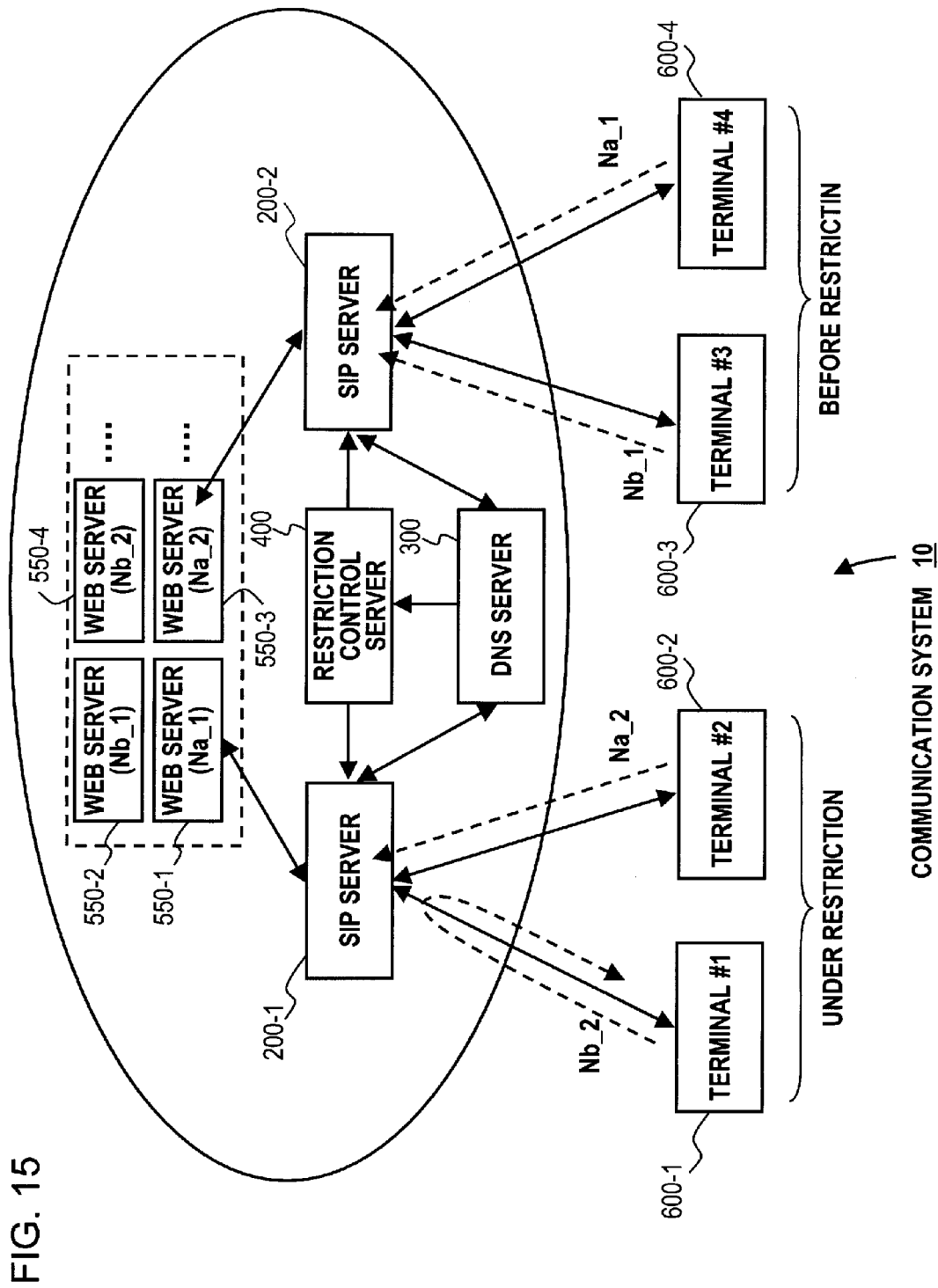
FIG. 15 illustrates another example of the configuration of a communication system.

The above-described examples have been explained using an IVR 500 as an example of a receiving-side apparatus. For example, as illustrated in FIG. 15, web servers 550-1, 550-2, . . . , may be receiving-side apparatus as well. Web servers 550-1, 550-2, . . . , each enable web page browsing, and for example the web server 550-1 may enable browsing of disaster emergency messages web pages, while the web server 550-2 may enable browsing of various web pages for video. Further, host names or IP addresses are allocated to each of the web servers 550-1, 550-2, . . . , and each terminal 600-1 to 600-4 can specify a host name and transmit a browsing request message. At this time, the SIP servers 200-1, 200-2 can acquire the IP address corresponding to the specified host name from the DNS server 300, and can transmit browsing request messages to the web servers 550-1, 550-2, . . . , having these IP addresses. The web servers 550-1, 550-2, . . . , upon receiving a browsing request message, transmit data and similar for browsing of the web page, so that the terminals 600-1 to 600-4 can perform browsing. In this case, host names for the web servers 550-1, 550-2, . . . , are divided into non-prioritized host names and prioritized host names, and similarly to the above-described examples, the query statistics unit 311 of the DNS server 300 counts the number of queries of prioritized host names in a certain cycle interval, and upon exceeding a restriction start threshold, sets an "under-restriction flag" in a first statistics table 331 or similar to "ON" or similar. The restriction control unit 340 also similarly transmits the non-prioritized host names which become objects for restriction to the SIP servers 200-1, 200-2 via the restriction control server 400, based on a third statistics table 333. Telephone numbers are replaced with host names to perform processing, and restriction cancellation operation can also be processed similarly to the above-described examples. By this means, accessing of web servers 550-1, 550-2, . . . , having non-prioritized host names can be restricted prior to the occurrence of congestion, and accessing of web servers 550-1, 550-2, . . . , having prioritized host names is possible even during restriction. Hence the occurrence of congestion can be suppressed even in the case of this communication system 10. Further, this communication system 10 can continue services for browsing web pages with high priority compared with other web pages.

Also, a personal computer or other terminal apparatus may be connected to the SIP servers 200-1, 200-2, and as a restriction request the terminal apparatus may transmit a non-prioritized telephone number to be restricted to the SIP servers 200-1, 200-2. Or, by transmitting a restriction cancellation request to cancel restriction to the SIP servers 200-1, 200-2, the terminal apparatus may cancel restriction of a previously restricted non-prioritized telephone number.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processing apparatus, comprising:
a query statistics unit which inputs a query request for querying a destination for first telephone number, and counts the number of input query requests; and
a restriction control unit which transmits to a restriction control apparatus which performs outgoing call restriction, a restriction request to restrict a telephone call by second telephone number, when the counted number of the query requests is equal to or greater than a restriction start threshold, wherein
the telephone call by the second telephone number is restricted by transmission of the restriction request, and a telephone call by the first telephone number is performed.

2. The processing apparatus according to claim 1, further comprising:
a first table which stores a flag indicating whether the number of query requests for the first telephone number is equal to or greater than the restriction start threshold, or not;
a second table which stores a combination of the first telephone number and the second telephone number; and
a third table which stores a flag indicating whether the second telephone number is restricted, or not, wherein
the query statistics unit identifies the second telephone number for restriction based on the first and second tables, and stores in the third table the identified second telephone number as the second telephone number for restriction, when the number of query requests is equal to or greater than the restriction start threshold, and
the restriction control unit transmits the restriction request for the second telephone number stored in the third table as the second telephone number for restriction.

3. The processing apparatus according to claim 2, wherein
the first table stores a first flag indicating whether the number of query requests for the first telephone number is equal to or greater than the restriction start threshold, or not,
the second table stores a second flag indicating whether the number of query requests for the first telephone number is equal to or greater than the restriction start threshold in the combination, or not,
the third table stores a third flag indicating whether the second telephone number is restricted, or not,
the query statistics unit sets to ON the first flag, sets to ON the second flag for the first telephone number for which the first flag is set to ON, when the number of query requests is equal to or greater than the restriction start threshold and the first flag is OFF, and sets to ON the third flag for the second telephone number, when in the combination there exists the second telephone number for which the second flag is ON, and
the restriction control unit transmits the restriction request for the second telephone number of which the third flag is ON as restriction telephone number.

4. The processing apparatus according to claim 1, further comprising an IP conversion unit which responds to the query request with an IP address.

5. The processing apparatus according to claim 1, wherein the restriction control unit transmits to the restriction control apparatus a restriction cancellation request to cancel restriction of the telephone call by the second telephone number, when the counted number of query requests for the first telephone number is equal to or less than the restriction cancellation threshold.

6. The processing apparatus according to claim 2, wherein
the query statistics unit identifies the second telephone number for restriction cancellation for the restricted second telephone number based on the first and second tables, when the number of query requests is equal to or less than a restriction cancellation threshold, and stores the identified second telephone number as the second telephone number for restriction cancellation in the third table, and
the restriction control unit transmits to the restriction control apparatus a restriction cancellation request for the second telephone number stored in the third table as the second telephone number for restriction cancellation.

7. The processing apparatus according to claim 3, wherein
the query statistics unit sets the first flag to OFF, and sets to OFF the second flag for the first telephone number for which the first flag is set to OFF, when the number of query requests is equal to or less than a restriction cancellation threshold and the first flag is ON, and sets the third flag for the second telephone number to OFF, when there exists the same second telephone number for which all of the second flags in the combination are OFF, and
the restriction cancellation unit transmits to the restriction control apparatus a restriction cancellation request for the second telephone number of which the third flag is OFF as the telephone number of restriction cancellation.

8. The processing apparatus according to claim 1, wherein the query request is a query request requesting conversion to the IP address for an automated response apparatus, and the first and second telephone numbers are receiving telephone numbers of the automated response apparatus.

9. The processing apparatus according to claim 1, wherein the query request is a query request requesting conversion from an identifier indicating a location in a network of an automated response apparatus to the IP address for the automated response apparatus.

10. A processing method in a processing apparatus, the method comprising:
inputting a query request for querying a destination for first telephone number, and counting the number of input query requests;
transmitting to a restriction control apparatus which performs outgoing call restriction, a restriction request for restricting a telephone call by second telephone number, when the counted number of the query requests is equal to or greater than a restriction start threshold; and
restricting the telephone call by the second telephone number by transmission of the restriction request, and performing a telephone call by the first telephone number.

11. A communication system, comprising:
a transfer apparatus which transfers a message to a transfer destination;
a restriction control apparatus which transmits an outgoing call restriction to the transfer apparatus; and
a processing apparatus, wherein
the processing apparatus includes a query statistics unit which inputs a query request transmitted from the transfer apparatus for querying a destination for first telephone number and counts the number of input query requests, and a restriction control unit which transmits to the restriction control apparatus a restriction request to restrict a telephone call by second telephone number when the counted number of the query requests is equal to or greater than a restriction start threshold, the restriction control apparatus transmits to the transfer apparatus the outgoing call restriction to restrict the second telephone number included in the restriction request, on receiving the restriction request, and the transfer apparatus transmits a telephone call disabling message to the transmission source of the message of which the second telephone number is a destination telephone number, to restrict a telephone call by the second telephone number and perform a telephone call by the first telephone number, on receiving the outgoing call restriction and the message of which the second telephone number is the destination telephone number.

* * * * *